(12) United States Patent
Akkaya et al.

(10) Patent No.: US 12,388,336 B2
(45) Date of Patent: Aug. 12, 2025

(54) ROTOR OF AN ELECTRIC MOTOR, METHOD FOR MANUFACTURING A ROTOR AND ELECTRIC MOTOR

(71) Applicant: Brose Fahrzeugteile SE & Co. Kommanditgesellschaft, Würzburg, Würzburg (DE)

(72) Inventors: Murat Akkaya, Coburg (DE); Antonio Surian, Due Carrare (IT); Michel Lanza, Grossa die Gazzo Radovano (IT)

(73) Assignee: Brose Fahrzeugteile SE & Co. Kommanditgesellschaft, Würzburg, Würzburg (DE)

( * ) Notice: Subject to any disclaimer, the term of this patent is extended or adjusted under 35 U.S.C. 154(b) by 142 days.

(21) Appl. No.: 18/175,707

(22) Filed: Feb. 28, 2023

(65) Prior Publication Data

US 2023/0208264 A1   Jun. 29, 2023

Related U.S. Application Data

(63) Continuation of application No. PCT/EP2021/073300, filed on Aug. 23, 2021.

(30) Foreign Application Priority Data

Aug. 28, 2020 (EP) .................................. 20193437
Sep. 11, 2020 (EP) .................................. 20195778

(51) Int. Cl.
*H02K 23/38* (2006.01)
*B60N 2/02* (2006.01)

(52) U.S. Cl.
CPC ......... *H02K 23/38* (2013.01); *B60N 2/02246* (2023.08)

(58) Field of Classification Search
CPC ............................................... H02K 13/04–08
(Continued)

(56) References Cited

U.S. PATENT DOCUMENTS

| | | |
|---|---|---|
| 4,532,449 A | 7/1985 | Aoki |
| 7,560,848 B2 | 7/2009 | Roos et al. |

(Continued)

FOREIGN PATENT DOCUMENTS

| | | |
|---|---|---|
| EP | 1834398 A1 | 9/2007 |
| EP | 1702401 B1 | 9/2010 |

(Continued)

OTHER PUBLICATIONS

Machine translation of JP-2008113485-A (Year: 2008).*
JP-2001275327-A machine translation (Year: 2001).*

*Primary Examiner* — Oluseye Iwarere
*Assistant Examiner* — Minki Chang
(74) *Attorney, Agent, or Firm* — Laurence A. Greenberg; Werner H. Stemer; Ralph E. Locher

(57) ABSTRACT

A rotor of an electric motor includes a rotor package with a plurality of radially directed rotor teeth and a commutator with a number of commutator bars which is twice as large as the number of rotor teeth. Diametrically opposed commutator bars are respectively connected to a contact bridge. A rotor winding includes a plurality of coils wound on the rotor teeth. Each coil has first and second coil ends and the first and second coil ends of each coil are connected directly to commutator bars that are not adjacent to each other. A method for manufacturing a rotor and an electric motor, are also provided.

8 Claims, 3 Drawing Sheets

(58) Field of Classification Search
USPC .......................................... 310/127–151, 173
See application file for complete search history.

(56) References Cited

U.S. PATENT DOCUMENTS

| | | | |
|---|---|---|---|
| 8,079,133 B2 | 12/2011 | Roods | |
| 2020/0235648 A1* | 7/2020 | Ogata | .................... H02K 23/38 |

FOREIGN PATENT DOCUMENTS

| | | | |
|---|---|---|---|
| JP | 2001275327 A | * | 10/2001 |
| JP | 2008113485 A | * | 5/2008 |
| JP | 2009060775 A | | 3/2009 |
| JP | 4395974 B2 | | 1/2010 |
| JP | 2014155416 A | | 8/2014 |
| WO | 0221665 A2 | | 3/2002 |

* cited by examiner

ROTOR OF AN ELECTRIC MOTOR, METHOD FOR MANUFACTURING A ROTOR AND ELECTRIC MOTOR

CROSS-REFERENCE TO RELATED APPLICATION

This application is a continuation, under 35 U.S.C. § 120, of copending International Patent Application PCT/EP2021/073300, filed Aug. 23, 2021, which designated the United States; this application also claims the priority, under 35 U.S.C. § 119, of European Patent Application EP 20 193 437.9, filed Aug. 28, 2020, and EP 20 195 778.4, filed Sep. 11, 2020; the prior applications are herewith incorporated by reference in their entirety.

FIELD AND BACKGROUND OF THE INVENTION

The invention relates to a rotor of an electric motor, in particular a rotor of a seat adjustment motor, including a stator package with at least four magnet poles, a rotor package with a plurality of radially directed rotor teeth and a commutator with a number of commutator bars. The invention further relates to a method of manufacturing such a rotor and an electric motor with such a rotor.

Motor vehicles today usually have a number of adjusting parts, for example a seat adjustment, an actuatable lock, window lifters and/or an adjustable sliding roof, which can be moved between different setting positions by using an associated electric motor-driven adjusting drives. The respective adjusting part is actuated by using a gear driven by a direct current motor, respectively an electric motor, for example in the form of a worm gear with a (drive-side) worm on the motor shaft and with a (output-side) worm wheel.

Such an electric motor, in particular a so-called commutator motor or brushed DC (Direct Current) motor, includes a stator and a rotor disposed on a motor shaft, which is rotated within the stator by an alternating magnetic field. In contrast to a brushless electric motor, an electric motor provided with a shaft-fixed commutator usually has two or more brushes which are in contact with commutator bars that transmit the electric current to the windings of a rotor rotating with the motor shaft. Through the use of the (commutator) bars, a commutation is generated from winding to winding, which generates a torque on the motor shaft (rotor shaft) in relation to the usually fixed magnetic poles (stator poles, excitation poles) of the stator.

European Patent EP 1 702 401 B1, corresponding to U.S. Pat. No. 7,560,848, discloses an electric motor with a four-pole stator, in which the rotor has a number of rotor slots and rotor teeth on the circumference, which is greater than the number of stator poles (excitation poles). The rotor further has a number of commutator bars, which is double the number of rotor teeth. The diametrically opposed commutator bars of the commutator are connected to each other by contact bridges. Given an even number of rotor slots, rotor teeth and coils from the coils disposed on adjacent rotor teeth, the beginning and the end of one coil are connected directly to adjacent commutator bars and the beginning of the other coil is connected by one of the contact bridges and the end is connected directly, or vice versa, to adjacent commutator bars.

SUMMARY OF THE INVENTION

It is accordingly an object of the invention to provide a particularly suitable rotor of an electric motor, a particularly suitable method for manufacturing a rotor and a particularly suitable electric motor, which overcome the hereinafore-mentioned disadvantages of the heretofore-known rotors, methods and motors of this general type.

With the foregoing and other objects in view there is provided, in accordance with the invention, a rotor of an electric motor, comprising a rotor stack with a plurality of radially directed rotor teeth and with a commutator with a number of commutator bars, which is twice as large as the number of rotor teeth, wherein commutator bars lying diametrically opposite one another are respectively connected to a contact bridge, and a rotor winding including a plurality of coils wound on the rotor teeth, wherein each coil has first and second coil ends and, the first and second coil ends of each coil are connected directly to commutator bars that are not adjacent to each other.

With the objects of the invention in view, there is also provided a method for manufacturing a rotor of an electric motor, comprising a rotor package with a plurality of radially directed rotor teeth and with a commutator with a number of commutator bars, which is twice the number of rotor teeth, wherein diametrically opposed commutator bars are respectively connected to a contact bridge, the rotor teeth are wound with a plurality of coils each having first and second coil ends, and the first and second coil ends of each coil are connected directly to commutator bars that are not adjacent to each other.

With the objects of the invention in view, there is concomitantly provided an electric motor, in particular a seat motor of a motor vehicle, comprising a rotor according to the invention.

Advantageous configurations and developments are the subject of the subclaims.

The rotor according to the invention is intended for an electric motor, in particular for an adjusting motor of a motor vehicle, preferably for a seat motor, and is suitable and equipped for this purpose. The rotor includes a rotor package which, in the assembled or installed state, is fixed to a motor shaft of the electric motor. The rotor further includes a commutator and a rotor winding.

The rotor package is, for example, configured as a punched-stacked laminated core with a plurality of radially aligned rotor teeth (armature teeth). Preferably, the rotor package includes an even number of rotor teeth. (Rotor) Slots are formed between the rotor teeth, wherein the rotor winding includes a plurality of coils wound around the rotor teeth in the slots. Each coil has a first and a second coil end. In the following the coil ends are also referred to as terminals. The commutator bars, for example, each include a hook, through the use of which the start or end of a first or second coil is connected.

The, for example, circular-ring-shaped commutator, includes a number of commutator bars (laminations), which is twice as large as the number of rotor teeth. For example, in a rotor package with six rotor teeth, one commutator with twelve commutator bars distributed around the circumference is intended. Diametrically opposed commutator bars are respectively connected by a contact bridge.

According to the invention, the two terminals of each coil are connected directly to commutator bars but never connected directly to commutator bars that are adjacent to each other. The two terminals of a coil are therefore not connected to commutator bars that are immediately adjacent to each other, i.e. are not connected to neighbouring commutator bars. In other words, the commutator bar connected to the first coil end is spaced from the commutator bar connected to the second coil end by at least one other commutator bar. Therefore, the commutator bar connected to the start or end of one coil is spaced from the commutator bar connected to the start or end of another coil by at least one commutator bar. Thus, a particularly suitable rotor is realized.

The term "axial" or an "axial direction" is understood in this case and in the following to mean in particular a direction parallel (coaxial) to the axis of rotation of the electric motor, i.e. perpendicular to the end faces of the rotor. Accordingly, in this case and in the following, "radial" or a "radial direction" is understood to mean in particular a direction oriented perpendicular (transverse) to the axis of rotation of the electric motor along a radius of the rotor, or respectively the electric motor. "Tangential" or a "tangential direction" in this case and in the following is understood to mean in particular a direction along the circumference of the rotor or the electric motor (circumferential direction, azimuthal direction), i.e. a direction perpendicular to the axial direction and the radial direction.

In a preferred embodiment, each rotor tooth is wound with a first coil and with a second coil. The first and second coils have opposite winding directions. In other words, the first coils are wound clockwise, for example, and the second coils counter clockwise or vice versa. This means that the rotor has a number of coils corresponding to the number of commutator bars, with two coils supported on each rotor tooth. Thus, the rotor has a compact configuration and a high mechanical, electrical and thermal load capacity.

The (first and second) coils, for example, are wound as concentrated windings around the respective rotor tooth. For example, coils are disposed one above the other in different (winding) layers or (winding) positions on the rotor tooth.

In an advantageous development, the first and second coils of respectively three adjacent rotor teeth are wound continuously, i.e. without interruption, from one winding wire. The coils of the three adjacent rotor teeth thus form a coil group which is made of one winding wire. A rotor with six rotor teeth therefore has two coil groups. Thus, a simple and material-saving rotor winding is realized.

In a conceivable configuration, the winding wire for sequentially disposed rotor teeth in the circumferential direction in a coil group is wound alternately as first and second coil. This way, a simple and reliable rotor winding is realized.

In a suitable configuration, a coil end of a first or second coil is connected in one piece with a contact bridge. This means that the coil end is formed monolithic or in one piece, i.e. uninterrupted with the contact bridge. In particular, the contact bridge is made from the same winding wire of the coil. This means that the contact bridge is manufactured or laid in the course of the coil winding. The contact bridge in this configuration is therefore a part or section of the rotor winding.

The advantages and embodiments mentioned with regard to the rotor can also be transferred to the manufacturing method described below and vice versa.

The method according to the invention is intended for manufacturing a rotor as described above and is suitable and configured for this purpose. According to the method, the rotor teeth are wound with a plurality of coils, each having two terminals. The start and end of each coil are connected directly to commutator bars that are not adjacent to each other.

In an advantageous embodiment, each rotor tooth is wound with a first coil and a second coil. For example, the first and second coils are wound onto the rotor teeth with opposite winding directions. Preferably, each rotor tooth is wound with a concentrated winding, wherein in total two layers of coils with opposite winding directions are wound on each armature tooth. Each commutator bar is connected to at least one of the armature tooth coils.

In a preferred configuration, two winding tools are provided, that operate at substantially the same time with two winding wires. In other words, the coils are wound simultaneously by two separate winding tools that operate at the same time with two different winding wires.

The winding tools are preferably so-called flyers, i.e. the rotor winding is produced by a fly-winding method. In the "flyer" winding technique, the winding wire is fed through a roll or through a nozzle, which is located on a "flyer." The flyer is in particular a rotating arm, which rotates at a certain distance from the coil.

In a practical embodiment, respectively three adjacent rotor teeth of the rotor stack are wound by each of the winding tools with a concentrate winding. In particular, in the case of the three adjacent rotor teeth, each rotor tooth is firstly wound with a first or second coil in a suitable development, wherein the winding direction for successive rotor teeth alternates, and wherein subsequently each rotor tooth is wound with the respective second or first coil. In other words, the winding direction is reversed or inverted for each coil winding. This means, for example, that the first rotor tooth is wound with a first coil and the second rotor tooth is wound with a second coil and the third rotor tooth is wound with a first coil, wherein subsequently the first rotor tooth is wound with a second coil and the second rotor tooth is wound with a first coil and the third rotor tooth is wound with a second coil.

In a preferred embodiment, the laying of the contact bridges is divided equally between the two separate winding tools, wherein the contact bridges are made with continuous wire, and wherein no pairs of diametral opposite commutator bars are linked with two contact bridges. In other words, the contact bridges are done and equally distributed between the winding tools, and there are no pairs of diametral opposite commutator bars that are connected with a double bridge. This means that each pair of diametral opposite commutator bars is connected by only a single contact bridge. This optimizes the wire length and tension of the winding wires when bend and anchored to the hooks of the commutator bars.

The following explanations in connection with the electric motor also apply analogously to the rotor and/or the method and vice versa. The electric motor according to the invention is configured in particular as a seat adjustment motor of a motor vehicle. The electric motor has a rotor as described above. The electric motor includes, for example, a so-called 4-6-12 motor topology with four stator or excitation poles and six rotor slots or rotor teeth as well as a commutator with twelve commutator bars. The commutator is brushed by two brushes, which are for example configured as cuboid rods pressed from carbon powder—possibly together with metal particles. The brushes are disposed perpendicular, i.e. 90° shifted, relative to each other.

Other features which are considered as characteristic for the invention are set forth in the appended claims.

Although the invention is illustrated and described herein as embodied in a rotor of an electric motor, a method for manufacturing a rotor and an electric motor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
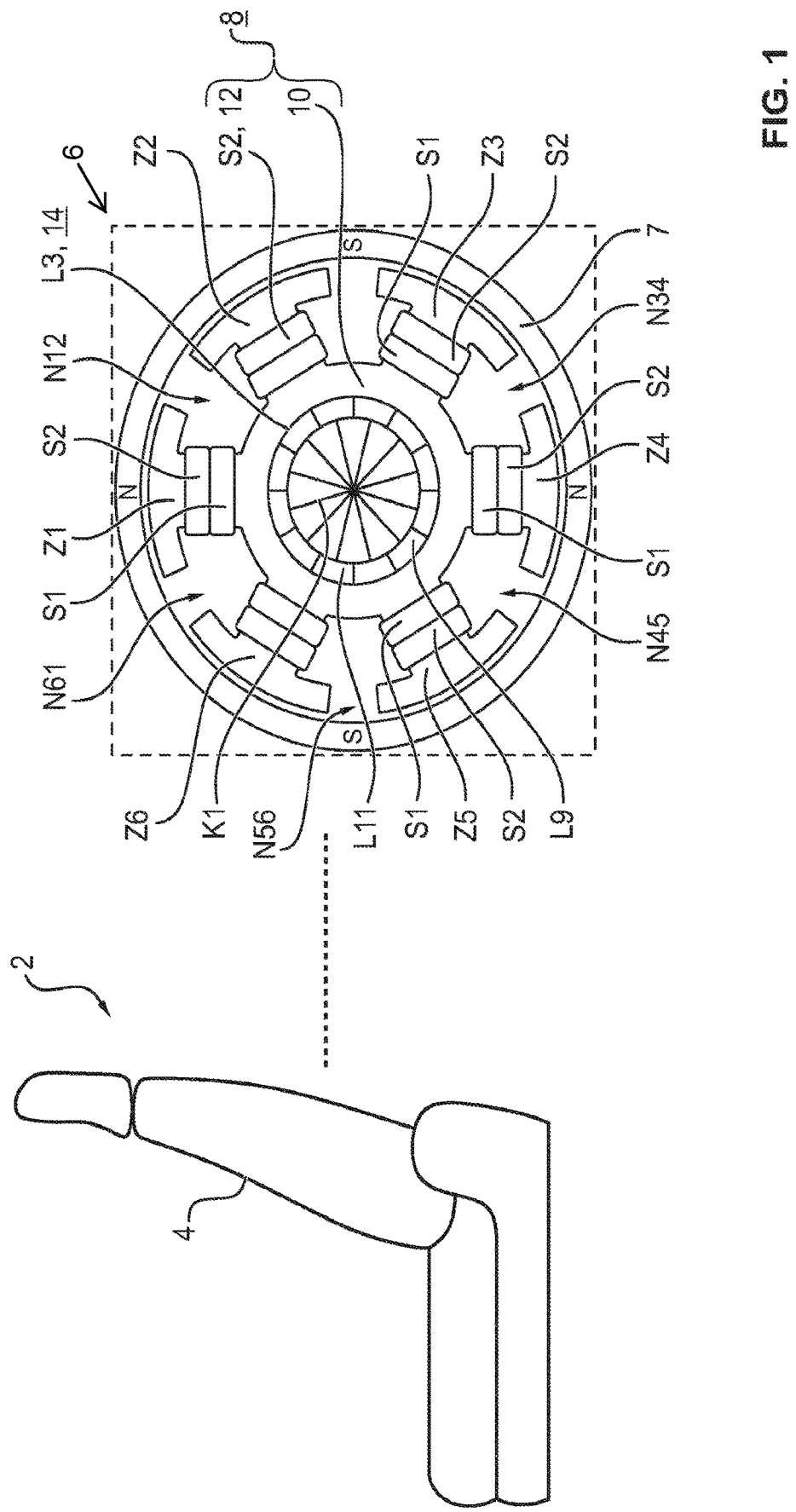
FIG. 1 is a diagrammatic and simplified illustration of a seat adjustment of a motor vehicle with a wound rotor.

Referring now in detail to the figures of the drawings, in which parts and sizes corresponding to each other are always provided with the same reference signs, and first, particularly, to FIG. 1 thereof, there is seen a diagrammatic and simplified illustration of a seat adjustment 2 of a vehicle seat 4 of a motor vehicle, which is not shown in detail. The seat adjustment 2 includes an electric motor 6 as a seat motor or adjustment motor. The electric motor 6 in this version has a four-pole stator 7, in which a rotor 8 is rotatably mounted as an internal rotor. In FIG. 1 only a magnet of the stator 7 is shown.

The rotor 8 includes a rotor package 10, which is equipped with a rotor winding 12. The rotor winding 12 is coupled with a commutator 14, which is brushed by a brush system of the electric motor 6. The rotor core 10 is preferably fixed to the shaft of the electric motor 6.

The electric motor 6 in this version has a so-called 4-6-12 motor topology. This means that the stator 7 is configured with four poles and the rotor 8 has six rotor teeth Z or rotor slots N, wherein the commutator 14 is provided with twelve commutator bars (laminations) L. The rotor teeth Z configured as pole teeth (armature teeth) are disposed radially outwardly in a star shape, with a first coil S1 and a second coil S2 being disposed on each rotor tooth Z. Two diametrically opposed commutator bars L are respectively connected by a contact bridge K. The commutator bars L respectively have a hook H (FIG. 2, FIG. 3) for contacting the coil ends of coils S1, S2. Each coil S1, S2 has two terminals, as first and second coil ends. The terminals of each coil are connected directly to commutator bars L or respectively to the corresponding hooks H, wherein the commutator bars L or hooks H are not adjacent to each other.

The coils S1 and S2 respectively have the same number of turns and differ substantially only in the winding direction CW, CCW. In the following, S1 is used for coils wound in clockwise CW direction and S2 for coils wound in counter clockwise CCW direction. In FIG. 1 the coils S1, S2 are shown as radially offset to each other on respectively one rotor tooth Z each, but preferably the coils S1, S2 are laid as concentrate winding one above the other in different layers or layers.

The coils S1, S2 and commutator bars L as well as the contact bridges K are only provided with reference signs as an example in FIG. 1.

Figure 2:
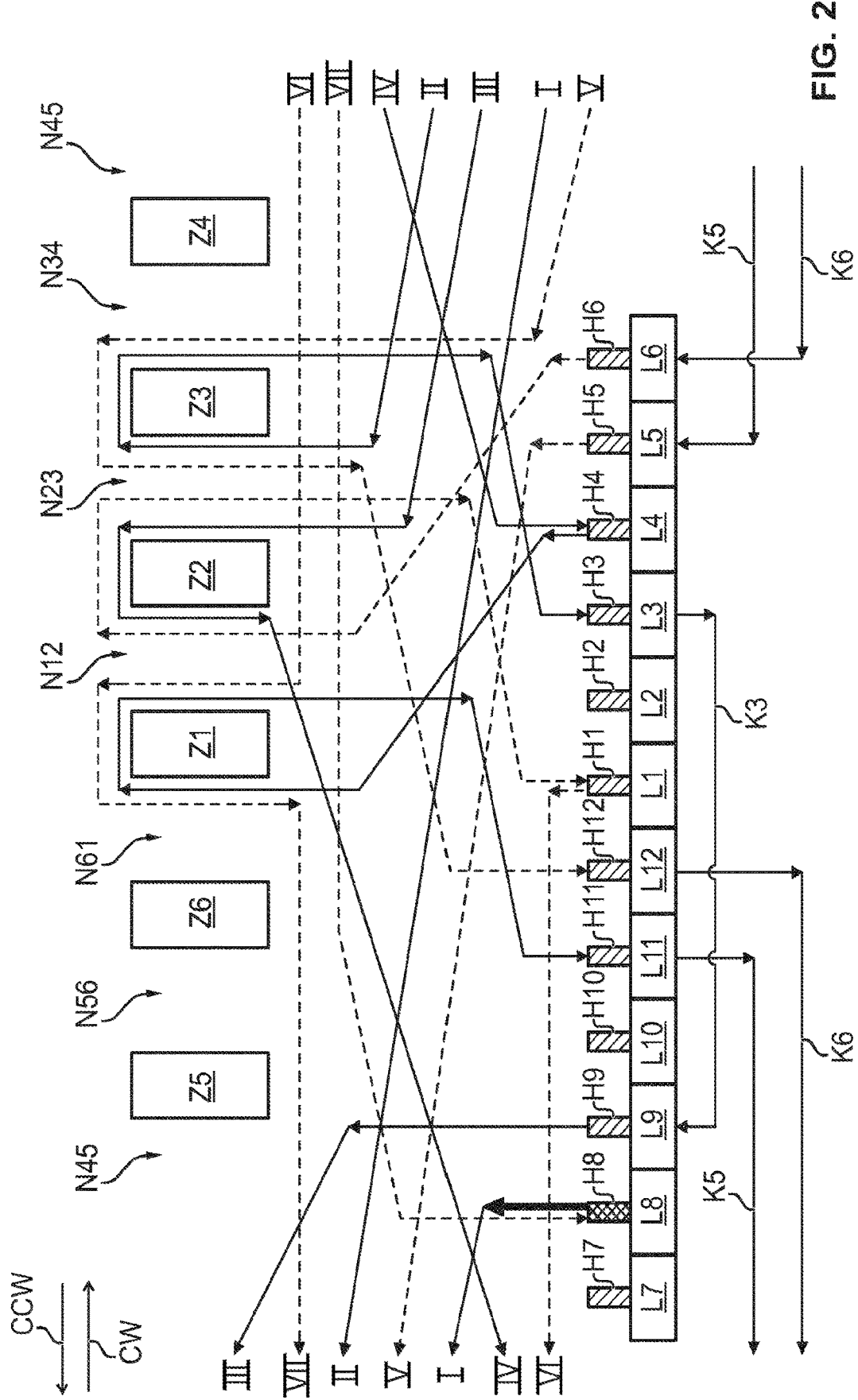
FIG. 2 is a block diagram illustrating a winding scheme for a first flyer for winding the rotor.

The rotor package 10 is wound by using two winding tools, in particular by using two flyers. In the following, a winding scheme for the production of the rotor winding 12 is explained in more detail using FIG. 2 and FIG. 3. FIG. 2 shows the winding scheme of the first flyer and FIG. 3 the winding scheme of the second flyer.

In order to explain the winding scheme of the rotor winding 12, the rotor teeth Z and rotor slots N as well as the commutator bars L are provided with a numbering in the figures and in the following description. The six rotor teeth are numbered consecutively as Z1 to Z6 and the six contact bridges as K1 to K6 as well as the twelve hooks as H1 to H12 and the twelve commutator bars as L1 to L12. The contact bridge K1 connects the commutator bars L1 and L7, the contact bridge K2 connects the commutator bars L2 and L8 and so on. The rotor slots are numbered with two digits, the first and second digit representing the rotor teeth between which the respective rotor slot is formed. This means that, for example, N12 is the rotor slot between the rotor teeth Z1 and Z2, and for example N34 is the rotor slot between the rotor teeth Z3 and Z4.

Figure 3:
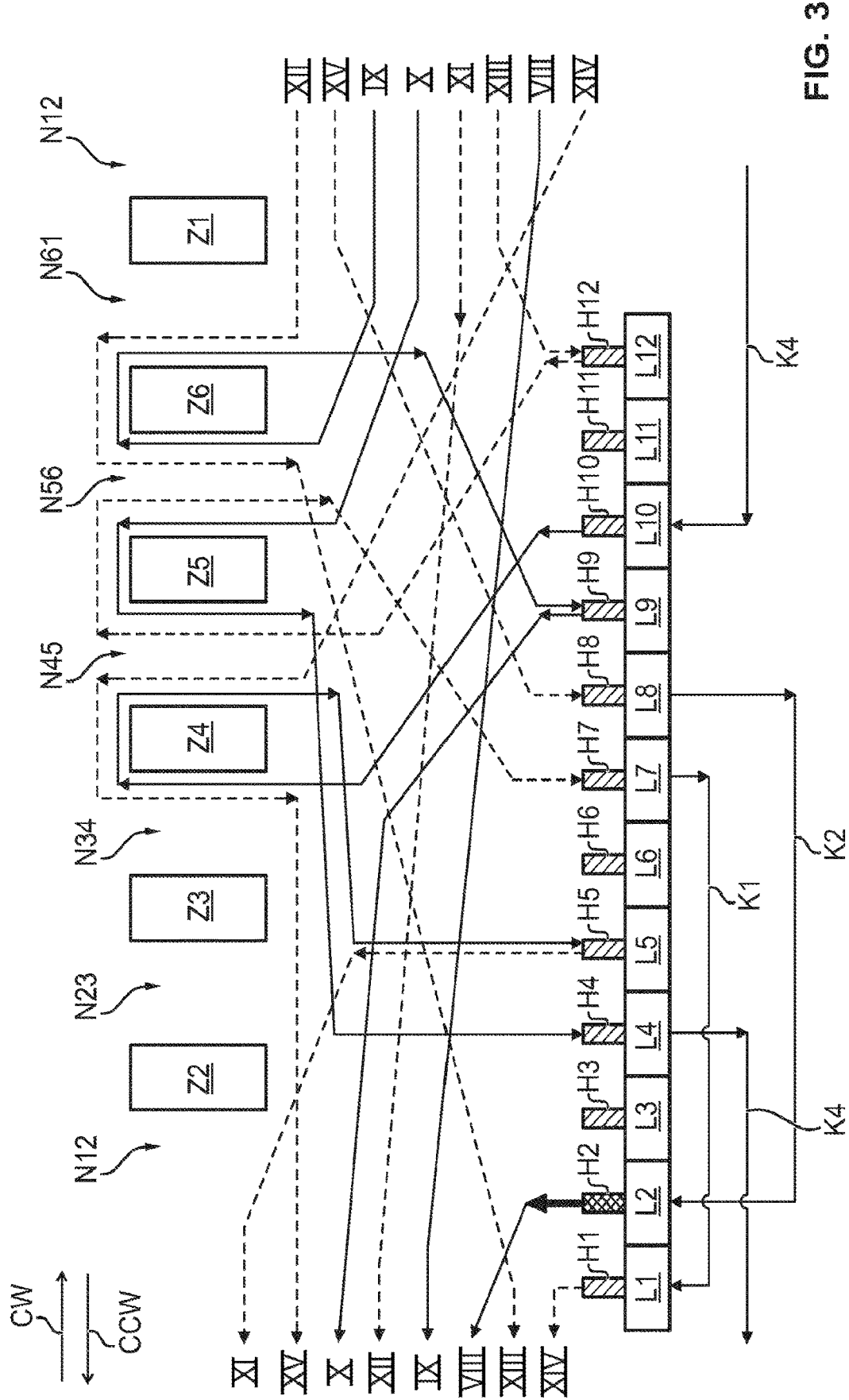
FIG. 3 is a block diagram illustrating a winding scheme for a second flyer for winding the rotor.

The flyers respectively wind a winding wire onto three adjacent rotor teeth Z1, Z2, Z3 and Z4, Z5, Z6, wherein several (wire) sections are formed in the course of the winding method. The sections which are led to the rotor teeth Z1 to Z6, respectively to rotor slots N12 to N61, are called coils S1, S2 and are shown in FIG. 2 and FIG. 3 above the commutator bars L1 to L12. Accordingly, the sections between the commutator bars L1 to L12 are referred to as contact bridges K1 to K6, which are shown in FIG. 2 and FIG. 3 below the commutator bars L1 to L12. Each section has a start and an end which is contacted by a commutator bar L1 to L12 or a corresponding hook H1 to H12.

In FIG. 2 to FIG. 3, the connections of the sections from one side of the illustration to the opposite side of the illustration are marked with Roman numerals.

The winding scheme of the first flyer is shown in FIG. 2 and summarized in the following table:

| Start | Section | Rotor slot | Rotor tooth | Winding direction | Rotor slot | End |
|---|---|---|---|---|---|---|
| L8/H8 | S1 | N23 | Z3 | CW | N34 | L3/H3 |
| L3 | K3 | | | | | L9 |
| L9/H9 | S2 | N23 | Z2 | CCW | N12 | L4/H4 |
| L4/H4 | S1 | N61 | Z1 | CW | N12 | L11/H11 |
| L11 | K5 | | | | | L5 |
| L5/H5 | S2 | N34 | Z3 | CCW | N23 | L12/H12 |
| L12 | K6 | | | | | L6 |
| L6/H6 | S1 | N12 | Z2 | CW | N23 | L1/H1 |
| L1/H1 | S2 | N12 | Z1 | CCW | N61 | L8/H8 |

The first flyer winds a rotor tooth group of the three adjacent rotor teeth Z1, Z2 and Z3. The flyer starts at the commutator bar L8, respectively at the hook H8, and is guided to the rotor slot N23. Subsequently, the rotor tooth Z3 is wound with the coil S1, wherein the coil end is guided from the rotor slot N34 to the hook H3, respectively to the commutator bar L3. From the commutator bar L3 the winding wire is led as contact bridge K3 to the commutator bar L9. The winding wire is led from the commutator bar L9 to the rotor slot N23 and wound as coil S2 around the rotor tooth Z2. The winding wire is then led from the rotor slot N12 to the commutator bar L4, respectively the hook H4. From there, the winding wire is wound around rotor tooth Z1 through rotor slot N61 as coil S1 and is led from rotor slot N12 to commutator bar L11. Subsequently the contact bridge K5 is laid between the commutator bars L11 and L5, and the winding wire is wound around the rotor tooth Z3 through the rotor slot N34 as coil S2. Preferably, the winding wire is not fed directly into the rotor slot 34 from the commutator bar L5, but is first laid 360° around the motor shaft. The winding wire is led from the rotor slot N23 to the hook H12 and laid as contact bridge K6 further to the commutator bar L6. From the commutator bar L6 the winding wire is led further to the rotor slot N12 and laid as coil S1 around the rotor tooth Z2. The end of the coil is led from the rotor slot N23 to the hook H1 of the commutator bar L1, and from there to the rotor slot N12 to be wound as coil S2 around the rotor tooth Z1. Finally, the coil end of the coil S2 is guided from the rotor slot N61 back to the hook H8 of the commutator bar L8.

The winding scheme of the second flyer is shown in FIG. 3 and summarized in the following table:

| Start | Section | Rotor slot | Rotor tooth | Winding direction | Rotor slot | End |
|---|---|---|---|---|---|---|
| L2/H2 | S1 | N56 | Z6 | CW | N61 | L9/H9 |
| L9/H9 | S2 | N56 | Z5 | CCW | N45 | L4/H4 |
| L4 | K4 | | | | | L10 |
| L10/H10 | S1 | N34 | Z4 | CW | N45 | L5/H5 |
| L5/H5 | S2 | N61 | Z6 | CCW | N56 | L12/H12 |
| L12 | S1 | N45 | Z5 | CW | N56 | L7/H7 |
| L7 | K1 | | | | | L1 |
| L1/H1 | S2 | N45 | Z4 | CCW | N34 | L8/H8 |
| L8/H8 | K2 | | | | | L2/H2 |

The second flyer winds a rotor tooth group of the three adjacent rotor teeth Z4, Z5 and Z6. The winding wire is guided from the commutator bar L2 to the rotor slot N56 and wound as a coil S1 around the rotor tooth Z6. Then the winding wire is led from the rotor slot N61 to the commutator bar L9 and from there to the rotor slot N56. The winding wire is wound as a coil S2 around rotor tooth Z5 and guided through rotor slot N45 to hook H4 of commutator bar L4. The winding wire is led from the commutator bar L4 as contact bridge K4 to the commutator bar L10. Subsequently, the coil S1 is wound around the rotor tooth Z4 in which the start of this coil is led from the commutator bar L10 through the rotor slot N34 to the rotor tooth Z4 and the end of this coil from the rotor slot N45 to the commutator bar L5. The winding wire is then wound around rotor tooth Z6 through rotor slot N61 as coil S2 and is led through rotor slot N56 to commutator bar L12. The coil S1 of rotor tooth Z5 is led from the commutator bar L12 through rotor slot N45 to rotor tooth Z5 and subsequently through rotor slot N56 to commutator bar L7. The winding wire is laid as a contact bridge K1 between the commutator bar L7 and the commutator bar L1. Afterwards, the winding wire is led from the commutator bar L1 to the rotor slot N45, laid around the rotor tooth Z4 as coil S2, and led to the commutator bar L8 through the rotor slot N34. Finally, the winding wire is laid as a contact bridge K2 between the commutator bar L8 and the commutator bar L2.

In the winding scheme of FIG. 2 and FIG. 3, thus respectively three adjacent rotor teeth Z1, Z2, Z3 and Z4, Z5, Z6 are wound together as groups of teeth. Preferably the coils S1, S2 and the contact bridges K1 to K6 are wound continuously, i.e. without interruption, for each rotor tooth group. In this winding scheme, respectively the rearmost rotor tooth Z3, Z6 in tangential direction is first wound with a coil S1 and then the middle rotor tooth Z2, Z5 is wound with a coil S2 and subsequently the frontmost rotor tooth Z1, Z4 is wound with a coil S1. Then the same rotor teeth Z1 to Z6 are wound in the same order with the other coil S1, S2. Thus, respectively a first coil S1 and a second coil S2 are wound alternately until each rotor tooth Z1 to Z6 is provided with a first and a second coil S1, S2. The flyers begin and end at diametrically opposed commutator bars L2, L8.

The invention is not limited to the configuration example described above. Rather, other variants of the invention can be derived from it by the expert without leaving the subject matter of the invention. In particular, all individual features described in connection with the configuration example can also be combined with each other in other ways without leaving the subject matter of the invention.

The following is a summary list of reference numerals and the corresponding structure used in the above description of the invention.

LIST OF REFERENCE SIGNS

2 Seat adjustment
4 Vehicle seat
6 Electric motor
7 Stator
8 Rotor
10 Rotor package
12 Rotor winding
14 Commutator
Z, Z1 . . . Z Rotor tooth
N, N12 . . . N61 Rotor winding
L, L1 . . . L12 Commutator bar
H, H1 . . . H12 Hook
K, K1 . . . K6 Contact bridge
CW, CCW Winding direction

The invention claimed is:

1. A rotor of an electric motor, the rotor comprising:
a rotor stack having a number of radially directed rotor teeth;
a commutator having a number of commutator bars being twice as large as said number of rotor teeth;
contact bridges each interconnecting a respective two of said commutator bars lying diametrically opposite one another;
a rotor winding including first and second coils wound in opposite winding directions on each of said rotor teeth;
said first and second coils of each three respective adjacent rotor teeth being wound continuously from one respective winding wire forming a coil group;
said winding wire of each coil group for said rotor teeth disposed successively in a circumferential direction being wound alternately as said first and second coils on said three adjacent rotor teeth, with a winding direction alternating for successive adjacent rotor teeth, causing each rotor tooth to be initially wound with said respective first or second coil and each rotor tooth to be subsequently wound with said respective second or first coil; and
each of said coils having first and second coil ends, said first and second coil ends of each of said coils being connected directly to respective commutator bars not being adjacent to each other.

2. The rotor according to one of claim 1, wherein a coil end is integrally connected to a contact bridge.

3. A method for manufacturing the rotor of the electric motor according to claim 1, the method comprising:
providing the electric motor having a rotor package with the number of radially directed rotor teeth, the commutator with the number of commutator bars being twice as large as the number of rotor teeth, and the contact bridges each interconnecting two respective diametrically opposed commutator bars;

operating two winding tools substantially simultaneously with two different winding wires for winding the rotor teeth with the plurality of coils each having first and second coil ends; and directly connecting the first and second coil ends of each coil to respective commutator bars not being adjacent to each other.

4. The method according to claim 3, which further comprises winding each rotor tooth with a first coil and with a second coil, and connecting each commutator bar to at least one of the rotor teeth.

5. The method according to claim 3, which further comprises using each of the winding tools to wind a respective three adjacent rotor teeth of the rotor package with a concentrate winding.

6. The method according to claim 5, which further comprises carrying out the winding of the three adjacent rotor teeth by:

first winding each rotor tooth with one of the first or second coils;

alternating a winding direction for successive rotor teeth; and then winding each rotor tooth with another of the first or second coils.

7. The method according to claim 3, which further comprises:

dividing laying of the contact bridges equally between the two winding tools;

making the contact bridges with continuous wires; and not linking any pairs of diametrically opposite commutator bars with two contact bridges.

8. The electric motor or electric seat motor of a motor vehicle, the electric motor or electric seat motor comprising the rotor according to claim 1.

* * * * *